United States Patent [19]

Holland

[11] 4,309,079

[45] Jan. 5, 1982

[54] ALL-DAY, ALL-YEAR SOLAR CONCENTRATOR

[76] Inventor: Beecher J. Holland, 600 Morison Ave., Kingsport, Tenn. 37660

[21] Appl. No.: 177,107

[22] Filed: Aug. 11, 1980

Related U.S. Application Data

[63] Continuation-in-part of Ser. No. 101,175, Dec. 7, 1979, abandoned, which is a continuation-in-part of Ser. No. 822, Jan. 4, 1979, abandoned, which is a continuation-in-part of Ser. No. 910,119, May 30, 1978, abandoned.

[51] Int. Cl.³ .............................................. G02B 5/10
[52] U.S. Cl. .................................. 350/292; 350/296; 350/299
[58] Field of Search ............... 350/293, 299, 296, 292, 350/289; 126/438, 439, 424, 441; 353/3

[56] References Cited

U.S. PATENT DOCUMENTS 4,108,158 8/1978 Kracklauer ...................... 126/438

FOREIGN PATENT DOCUMENTS 1476717 6/1969 Fed. Rep. of Germany .

Primary Examiner—Jon W. Henry

[57] ABSTRACT

The invention is a solar radiation concentrator wherein an array of solar collectors is disposed in a semicircle and rotatable 180 degrees about an axis in the plane of the semicircle to achieve seasonal adjustment. Each said collector is slightly tilted out of the plane of said semicircle, whereby seasonal adjustment of said array may be achieved by rotating said array through 180 degrees twice a year.

3 Claims, 4 Drawing Figures

ALL-DAY, ALL-YEAR SOLAR CONCENTRATOR

CROSS-REFERENCE TO RELATED APPLICATION

This application is a continuation-in-part application of application Ser. No. 06/101,175, filed Dec. 7, 1979, now abandoned, which was a continuation-in-part application of application Ser. No. 000,882, filed Jan. 4, 1979, now abandoned which was a continuation of Ser. No. 910,119 filed May 30, 1978, now abandoned.

REFERENCES

Foreign Patents 1,476,717, 6/1969, Germany, 259/350.

The present invention is a non-tracking solar radiation concentrator. The concentrator will receive and concentrate radiation throughout the daily period of direct sunlight throughout any portion of the year without solar tracking. The concentrator comprises a plurality of generally cone-shaped concave solar collectors arranged in a convex circular array extending nearly a semicircle for receiving solar radiation throughout the day, said array being rotatable through 180 degrees about the diameter defining said semicircle, and each said collector being slightly tilted out of the plane of said semicircle,. whereby seasonal adjustment of said array may be achieved by rotating said array through 180 degrees twice a year.

The cross section of the solar collector is of wide-angle capability compared to the common parabolic cross section. That is, it acts with incoming radiation incident to the longitudinal center line of a sectional view by angles beyond the capability of the common parabolic collector. All-year operation requires only semiannual, simple rotation of said array through 180 degrees about an axis of central east-west position in the plane of said semicircle and essentially perpendicular to the intersection of said plane and the local horizontal plane.

The commonparabolic solar collectors are constantly aimed at the sun to be effective, whereas the invention concentrates throughout the daily period of direct sunlight and throughout the year without tracking the sun. German printed specification (offenlegungschrift) discloses a non-tracking solar collector. However, it appears to disclose conventional tilting to achieve seasonal adjustments. The present invention is superior in that required adjustment is simpler by avoiding multiple increments of adjustment and comparatively infrequent.

The object of the present invention is to offer a degree of solar-radiation concentration suitable for many applications with a more simple and infrequent mode of adjustment to varying solar altitude and zenith.

DETAILED DESCRIPTION OF THE PREFERRED EMBODIMENT

The object, design and functioning of the invention will be clarified hereinafter by an embodiment of the invention described by the specification with reference to the accompanying drawings for which like item numbers refer to the same items in two of the figures.

Figure 1:
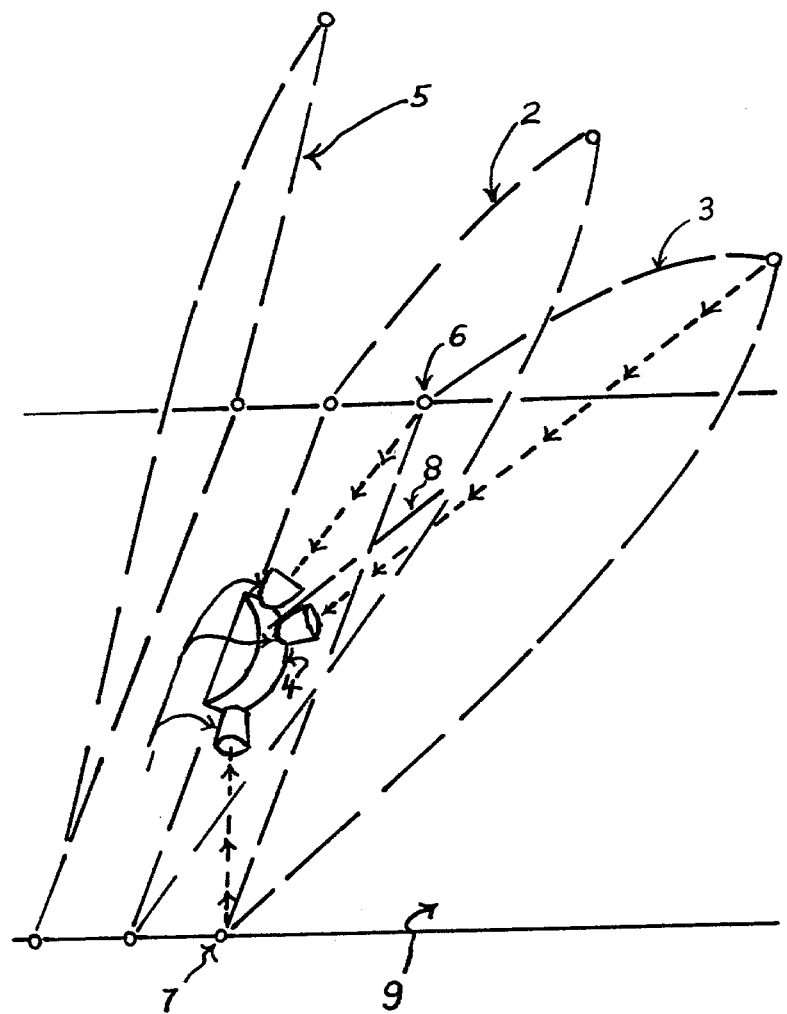
FIG. 1 and 4 are views from above of different embodiments of the solar radiation concentrator and of typical paths of solar traverse.
Figure 3:
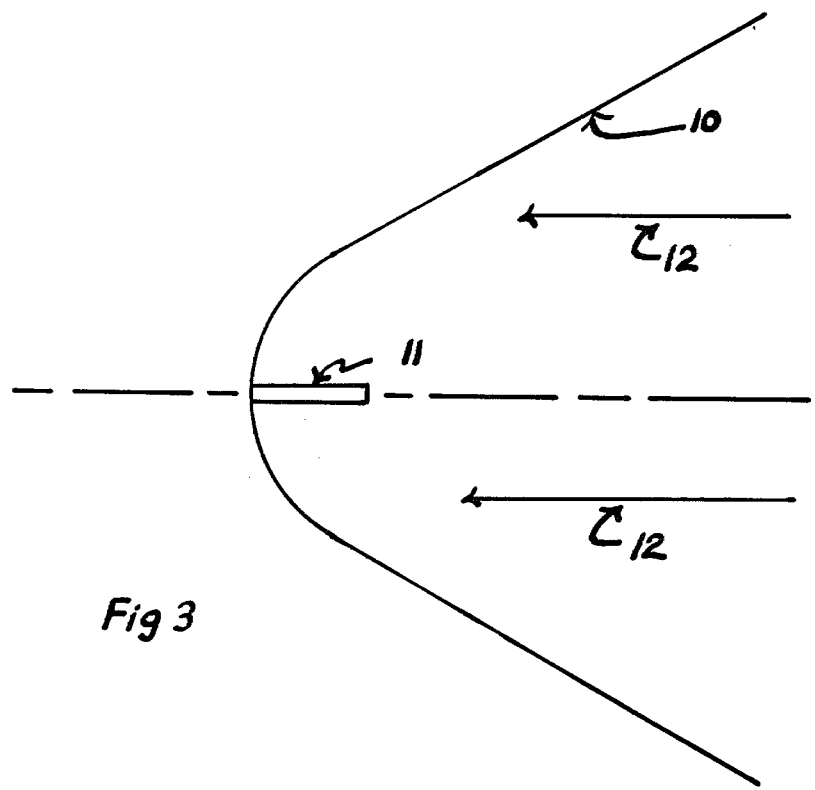
FIG. 3 is a cross-sectional view of one of the array of cone-shaped collectors making up the solar radiation concentrator.

One embodiment of the invention, a solar radiation concentrator incorporating a plurality of generally cone-shaped concave solar collectors is shown by FIG. 1. Items 1 are generally cone-shaped concave solar collectors of wide-angle capability arranged in a convex circular array with comparable base points fixed at points of a semicircular supporting framework 4, extending nearly a semicircle for receiving solar radiation throughout the day, the width of which centers about the plane of path 2,the central apparent path of solar traverse for the period of application. The radiation-receiving openings of the solar collectors have their centers aimed at positions on the apparent path 3 of solar traverse on one day. Said solar concentrator is rotatable about an axis 8 (the central diameter defining said semicircle) laying in the plane of path 2 whereby seasonal adjustment of said array is achieved by rotating said array through 180 degrees twice a year. Said axis is perpendicular to the intersection of the plane of path 2 and the local horizontal plane 9. Item 5 represents the apparent path of solar traverse on another day. Said solar collector may be as shown in cross section by FIG. 3 wherein the solar collector comprises (a) a reflecting surface 10 consisting of a circular section and tangential extensions such that said extensions extend by less than three diameters of said circular section and (b) receiving-converting means 11 extending outward by less than one radius of said circular section from the base within the cavity formed by the reflector and symetrically about the longitudinal centerline of the sectional view. The receiving-converting means 11 is coincident with the imagined continuation of the reflector surface in the reflector base area occupied by said means. Incoming radiation is shown in FIG. 3 by item 12.

Figure 2:
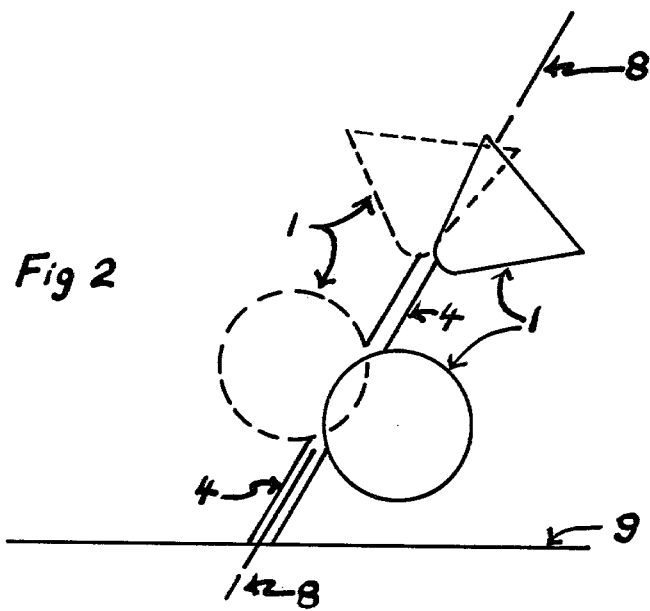
FIG. 2 is a side view of the solar radiation concentrator.

Operation of the rotatable system of FIG. 1 is evidenced by FIGS. 1 and 2. The rising sun at 6 radiates into those collectors 1 on its end of the semicircular section 4 which are receptive to it. Similar statements are true of later solar positions along path 3, through near-sunset at 7. Daily paths of solar traverse will progress toward that of 2 and beyond, the direct solar radiation all the while being received and concentrated as above along path 3. At the time of occurrence of path 2, the assembly is rotated 180 degrees about its axis 8 (which is in the plane of path 2) and is prepared to concentrate radiation from path 2 on to the position at path 5 and beyond and back to the intermediate path of 2 again. Due to the axis of rotation being in the plane of path 2 and overlapping radiation reception from path 2 at the two different positions of the assembly, before and after rotation, the same degree of concentration takes place for path 2 before and after rotation. "Before" and "after" rotation positions may be clarified by FIG. 2, a side view of the assembly of FIG. 1, wherein the solid line items 1 are concentrators "before rotation" and the broken lines are "after rotation", item 8 being the axis of rotation.

Figure 4:
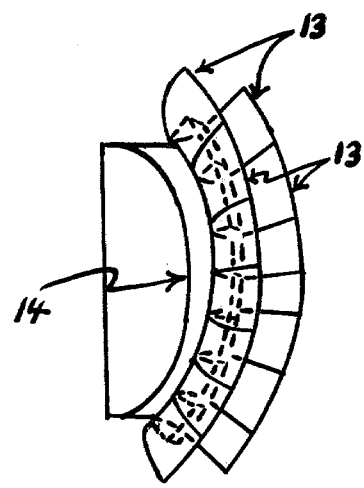

A second embodiment of the solar concentrator is as shown by FIG. 4 (view from above). This is a solar radiation concentrator like the preferred embodiment wherein each of said plurality of collectors is generally a cone-shaped concave solar collector 13 in diametric section (width-wise) only (diameter of said semicircle) and is of matching contiguous curvature in said diametric section with that of adjacent collectors, thus forming an essentially continuous collector along the perimeter of said semicircle 14.

A third embodiment of the solar concentrator is like the second wherein said plurality of collectors are fabricated as one continuous collector.

I claim:

1. A solar radiation concentrator comprising a plurality of generally cone-shaped concave solar collectors arranged in a convex circular array extending nearly a semicircle for receiving solar radiation throughout the day, said array being rotatable through 180 degrees about the diameter defining said semicircle, and each said collector being slightly tilted out of the plane of said semicircle, whereby seasonal adjustment of said array may be achieved by rotating said array through 180 degrees twice a year.

2. A solar radiation concentrator comprising a plurality of solar collectors arranged in a convex circular array extending nearly a semicircle for receiving solar radiation throughout the day, wherein each solar collector is generally cone shape in diametric (diameter of said semicircle) section only (width-wise), said array being rotatable through 180 degrees about the diameter defining said semicircle, and each said collector being slightly tilted out of the plane of said semicircle, whereby seasonal adjustment of said array may be achieved by rotating said array through 180 degrees twice a year and wherein each said collector is of matching contiguous curvature in said diametric section with that of adjacent collectors, thus forming an essentially continuous collector along the perimeter of said semicircle.

3. A solar radiation concentrator as in claim 2 wherein said plurality of collectors are fabricated as one continuous collector.

* * * * *